United States Patent [19]
Perkins et al.

[11] Patent Number: 4,636,915
[45] Date of Patent: Jan. 13, 1987

[54] FASTENER HAVING DUAL TEETH

[75] Inventors: Norman P. Perkins, Duluth; Roger D. Luke, Stone Mountain; Steven A. Kaufman, Decatur, all of Ga.

[73] Assignee: Siemens Energy & Automation, Inc., Atlanta, Ga.

[21] Appl. No.: 767,644

[22] Filed: Aug. 20, 1985

[51] Int. Cl.⁴ .............................................. H02B 1/14
[52] U.S. Cl. .................................... 361/355; 24/297; 174/138 D; 361/361; 411/508
[58] Field of Search ................. 24/289, 297, 580, 621; 174/138 D; 248/73, 221.4; 361/353–355, 358, 361, 412; 403/71, 406.1, 407.1; 411/508, 548, 908

[56] References Cited

U.S. PATENT DOCUMENTS

| | | | |
|---|---|---|---|
| 2,278,691 | 4/1942 | Cotter | 248/73 |
| 3,748,696 | 7/1973 | Martin | 24/16 PB |
| 3,916,089 | 10/1975 | Sloan | 248/73 |
| 4,334,659 | 6/1982 | Yuda | 248/73 |
| 4,495,380 | 1/1985 | Ryan et al. | 361/412 |

Primary Examiner—A. D. Pellinen
Assistant Examiner—Gregory D. Thompson
Attorney, Agent, or Firm—F. W. Powers; J. L. James

[57] ABSTRACT

A plastic fastener assembly is provided which has a base with an upstanding stab which has a single first tooth formed on one side of the stab and at least one second tooth formed on the opposite side of the stab. A cover defines an opening for receiving the stab. The cover has a control rail adjacent the opening and a flap extending into the opening opposite the central rail. The rail slides along the surface of the first tooth during assembly and urges the first tooth and stab toward the flap until the rail engages the notch of the first tooth. The flap automatically moves from the base during assembly as the first tooth and stab move toward the flap. The flap engages the second tooth when assembled inhibiting separation of the stab and cover.

11 Claims, 5 Drawing Figures

FASTENER HAVING DUAL TEETH

CROSS REFERENCE TO RELATED APPLICATIONS

This application is related to application Ser. No. 723,321 filed Apr. 14, 1985 entitled "Three Phase Load Center and Method of Assembly".

BACKGROUND OF THE INVENTION

This invention relates generally to fasteners, and more particularly, to plastic fasteners for holding members together without the use of screws or bolts.

From time to time it is desirable to connect or fasten two pieces of material or two objects to each other in a simple and efficient manner. Historically, members were joined using nails, screws, bolts, welding and other joining and connecting methods. While these methods certainly accomplish the task of joining the members, by and large, they were inefficient, time consuming, and required the use of tools. From time to time, it was also desirable to bundle materials using twine or wire or some other material to secure the bundle. While string is effective in securing materials in a bundle, it is time consuming and the string is subject to wear and eventual breakage. Accordingly, it will be appreciated that it would be highly desirable to provide a simple, efficient fastener which does not require tools to assemble and which is wear resistant.

As in other fields of technology, modern plastic materials are being used in fasteners. One such fastener is described in U.S. Pat. No. 3,748,696 which issued July 31, 1973 to M. F. Martin. Martin discloses a plastic fastener for joining objects together wherein a bolt member has a sharpened shank which pierces the object to be joined. The bolt member also has normally outwardly projecting but inwardly flexible anchor members formed integrally on the shank to engage shoulders on a nut member. After the bolt pierces the object, the nut is forced axially onto the bolt shank, flexing the anchor members inwardly. The anchor members then spring out into engagement with internal shoulders in the bore of the nut to hold the nut onto the bolt. The shank is sharpened so that it may be driven into the objects to be joined with aid of the hammer of similar tool. The shank and nut of the fastener can be connected with a connecting strip so that the fastener may be used to secure bundles. Martin designed this fastener for use in securing tire carcasses together to form structural objects for use in fresh and salt water environments. In such an application, it is not necessary that there be no relative motion between the two members which are secured together by the fastener. However, when assembling electrical equipment such as a load center or when assembling machine parts or other things that require close tolerances, relative motion between the parts to be joined must be limited. Accordingly, it would be appreciated that it would be highly desirable to provide a simple plastic fastener which secures the parts together and minimizes the relative motion between parts.

When using plastic materials such as nylon, for example, the parts of the fastener are force fitted together so that one of the plastic members is deformed during assembly and is required to reform after assembly so that the parts are securely held together. While this is possible, it is extremely difficult to achieve and almost impossible while the fastener may be subject to forces tending to separate the parts so joined. Accordingly, it will be appreciated that it would be highly desirable to have a fastener in which the parts are force fitted together forming a connection and which is assisted in the reforming process so that the completed fastener assembly withstands separation forces and provides a dimensionally precise connection.

It is an object of the present invention to provide a plastic fastener.

Another object of the present invention is to provide a plastic fastener which can be used in applications requiring dimensional tolerances.

Still another object of the present invention is to provide a fastener which is adaptable to assembly using an assembly machine.

SUMMARY OF THE INVENTION

Briefly stated, in accordance with one aspect of the invention, the foregoing objects are achieved by providing a fastener assembly having dual teeth. The fastener assembly includes a base with an upstanding stab which has a single first tooth formed on one side of the stab and at least one second tooth formed on the opposite side of the stab. The fastener assembly includes a cover which defines an opening for receiving the stab with the teeth thereon. The cover has a first portion adjacent the opening and a flap extending into the opening opposite the first portion. The first cover portion slides along the surface of the first tooth during assembly and urges the first tooth and stab in a direction toward the flap until the first cover portion engages the notch of the first tooth. The flap is pivotally movable towards the base and automatically moves from the base during assembly as the first tooth and stab are urged toward the flap. The flap engages the second tooth when assembled inhibiting separation of the stab and cover.

BRIEF DESCRIPTION OF THE DRAWINGS

While the specification concludes with claims particularly pointing out and distinctly claiming the subject matter which is regarded as the invention, it is believed that the invention would be better understood from the following description of the preferred embodiment taken in conjunction with the accompanying drawings in which:

DESCRIPTION OF THE PREFERRED EMBODIMENT

Figure 1:
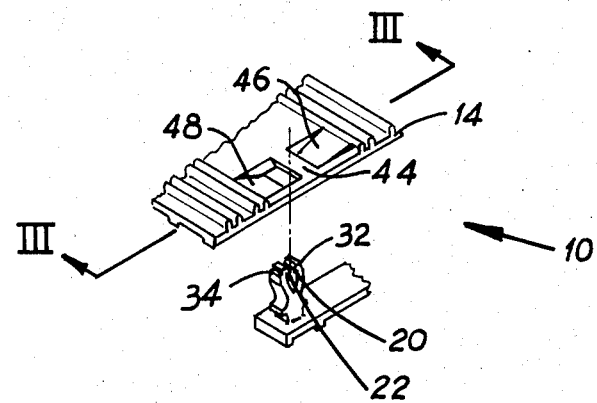
FIG. 1 is an isometric view of a disassembled fastener assembly in accordance with the present invention.
Figure 3:
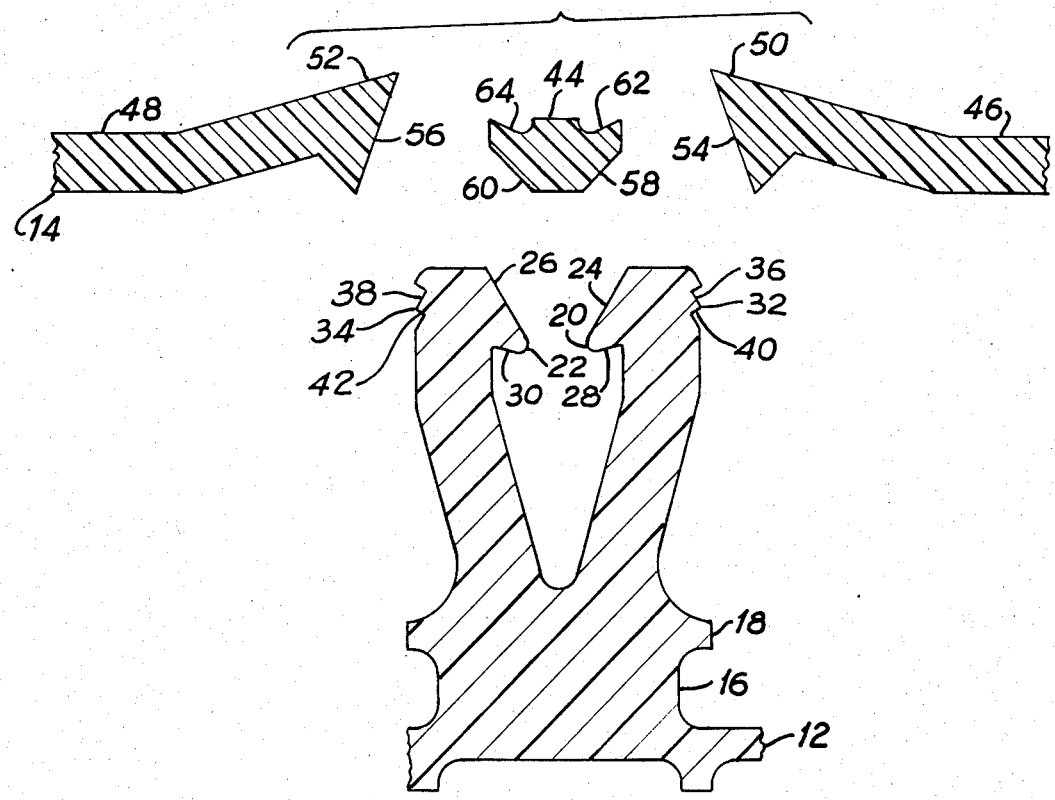
FIG. 3 is a somewhat enlarged sectional view taken along line III—III of FIG. 1.
Figure 2:
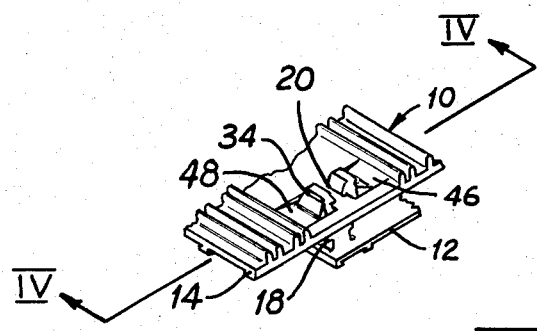
FIG. 2 is an isometric view similar to FIG. 1 but showing the fastener assembly partially assembled.
Figure 4:
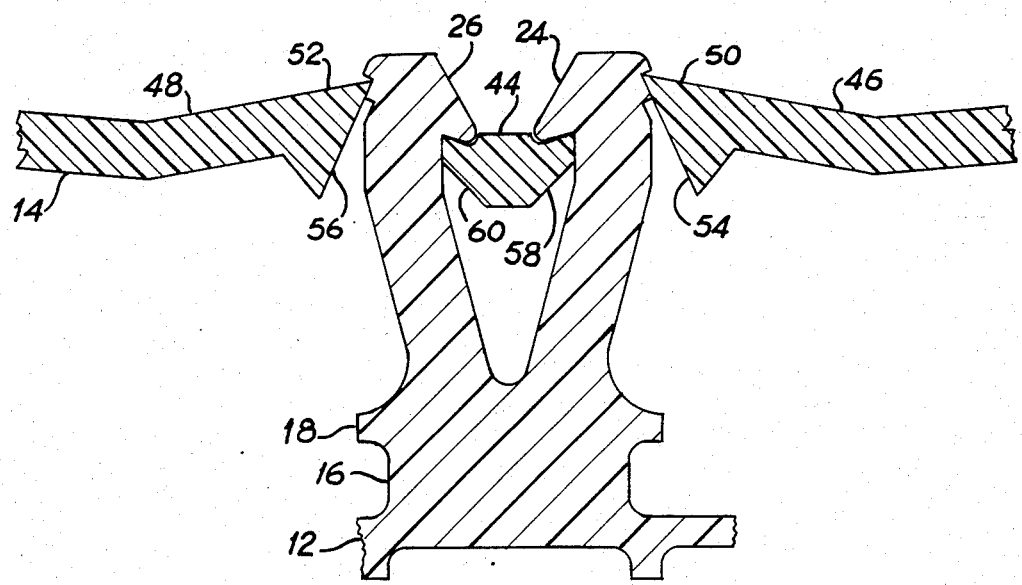
FIG. 4 is a somewhat enlarged sectional view taken along line IV—IV of FIG. 2.
Figure 5:
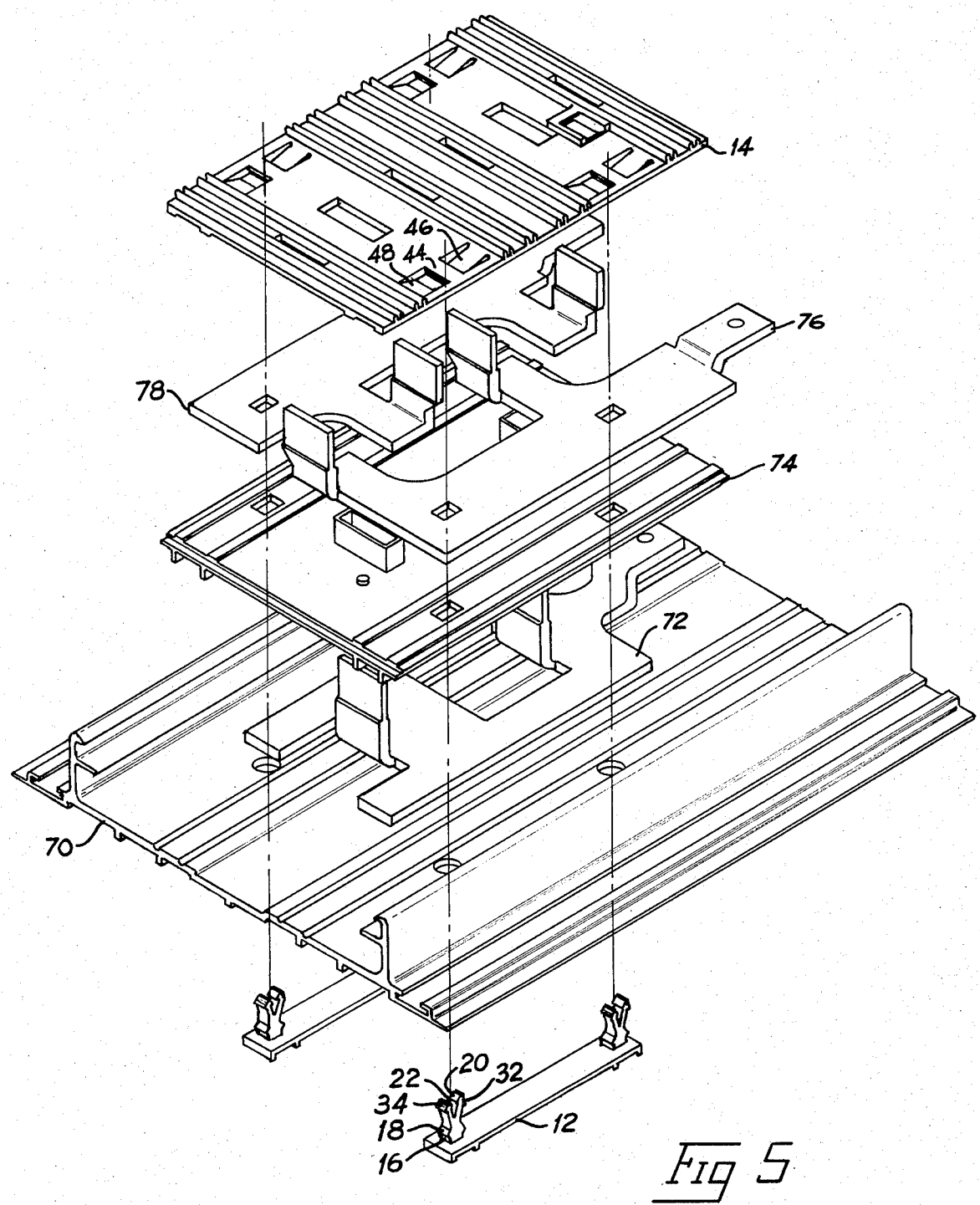
FIG. 5 is an exploded view of a three-phase load center utilizing a fastener assembly having dual teeth.

Referring to FIGS. 1 and 3, a fastener assembly 10 includes a base 12 and a cover 14 which can be connected together thereby securing therebetween the members to be fastened. The base and cover may also be joined together by a flexible member so that it is suitable for securing bundles. The base has an upstanding stab 16 with bifurcated end portions remote from the base 12. The bifurcated end portions of the stab 16 are resilient members which are slightly moveable towards and from one another to accept the cover 14 during assembly. FIGS. 1-4 illustrate a base with a single stab while FIG. 5 illustrates a plurality of stabs.

The stab 16 may have a shoulder 18 positioned between the base 12 and the bifurcated end portions of the stab 16. The shoulder 18 is useful for fitting through an opening in one of the members to be fastened so that the stab extends in an upright position and is retained on the member to be fastened to facilitate an automated assembly process. In actual practice, the base 12 may form part of one of the members to be joined.

Each upstanding bifurcated end portion of the stab 16 has a single first tooth 20, 22 with an upper surface portion 24, 26 and a lower surface or notch portion 28, 30. Each bifurcated end portion of the stab 16 also contains at least one second tooth 32, 34 which has a top surface 36, 38 and a bottom surface or notch portion 40, 42. The first tooth 20, 22 is positioned on the inside of the bifurcated end portion of the stab 16 and the second tooth 32, 34 is positioned on the opposite side of the stab bifurcation.

The cover defines openings for receiving the bifurcated stab with the teeth thereon. As with the base 12, the cover 14 may also form one of the members to be joined. The cover has a central bar or catch 44 positioned between the two openings and flaps 46, 48 adjacent the openings opposite the central bar 44 with one end free and the other end attached to the cover 14. Each flap is pivotally movable towards and from the base. Each flap has a top surface 50, 52 and a bottom surface 54, 56 which preferably form an acute angle.

Referring to FIGS. 1-4, the central bar 44 has bottom surfaces 58, 60 and top surfaces 62, 64. The bottom surfaces 58, 60 and slidably engage the top surfaces 24, 26 of the slab 16 and the top surfaces 62, 64 engage the notch surfaces 28, 30 of the stab 16 during assembly. It will be appreciated that when the top surfaces 62, 64 of the central bar 44 engage the notch surfaces 28, 30 of the base, the base and cover are joined together and cannot be unintentionally separated. When so joined, any members between the base 12 and cover 14 are also held fast and cannot be removed or separated without dismantling the joint. It will also be appreciated that the fastener assembly is operable where the stab 16 is not bifurcated but has a single stab end portion with the appropriate first tooth 20 thereon which will engage the central bar 44 and the second tooth 32 which engages the flap 46.

During assembly, as the cover is placed over the stab and urged into position, the central bar slides along the teeth 20, 22 and forces the teeth away from each other until the central bar is positioned such that the bifurcated end portions snap into position with the top surfaces of the central bar engaging the bottom surfaces of the first teeth. Also during assembly, as the central bar 44 slides along the first teeth 20, 22, each bifurcation is urged in a direction toward a respective flap until the central bar engages the notches. The flaps 46, 48 are pivotally movable towards and from the base 12 and automatically move from the base 12 during assembly as the respective tooth and bifurcation are urged toward the flap. Each flap 46, 48 engages a respective second tooth 32, 34 when assembled thereby inhibiting separation of the base 12 and cover 14 (see FIGS. 2 and 4). With each flap engaging a respective second tooth, the flap urges the bifurcation toward more positive engagement with the central bar 44 thereby assuring a rigid connection. It can be appreciated that with the present design, the use of a plurality of second teeth on each bifurcated end portion allows control of the displacement of that bifurcation toward the central bar so that a tighter union between the base and cover is obtained. In this manner, parts may be joined which require close tolerances regarding the amount of relative movement which can exist between the parts when fastened together. Thus, the tightness of the connection using the present fastener assembly is not strictly limited by the relative dimensions of the central bar 44 and the first teeth 20, 22 but is under the control of the spacing and dimensions of the second teeth 32, 34 and the flaps 46, 48.

An application of the fastener assembly having dual teeth is illustrated in FIG. 5 in which the fastener assembly is used in a three-phase load center. A load center of this type is fully discussed in co-pending application Ser. No. 723,321, filed Apr. 14, 1985 and is incorporated herein by reference. Briefly stated, the three-phase load center consists of a base pan 70 which has appropriate openings for receiving fasteners. A bus bar 72 with upstanding stabs is positioned on the base pan clear of the openings through which the fasteners will extend. An insulator 74 with openings for receiving the stabs of the bus bar 72 is placed atop the bus bar 72. The insulator 74 has openings which align with the openings in the base pan. Second and third bus bars 76, 78 are positioned on the insulator 74. The bus bar 76 has upstanding stabs and openings which align with the openings in the insulator 74 and base pan 70. The bus bar 78 also has upstanding stabs and openings which align with the openings in the insulator 74 and base pan 70. The bus bars 76 and 78 are spaced from each other to insure electrical isolation one from the other.

As illustrated, the fastener assembly consists of two of the bases 12, each of which contains at least two upstanding stab assemblies 16 and a cover 14 which has four central bars 44, one for each base stab assembly. In this particular embodiment, the cover is made of a plastic material which has excellent insulating qualities and forms the top insulator for the load center. While the bases are illustrated as being separate units from the base pan, the base portion of the fastener assembly could have been integrally molded onto the base pan. When assembled, the stabs of the bus bars 72, 76 and 78 protrude through the openings in the cover. It can be appreciated that in a load center the stabs of the bus bars and the bus bars themselves must stay fixed in position so that the circuit breakers which are assembled on the load center can be properly installed and operated.

During assembly, the cover is positioned with the bus bars extending through the openings and is pushed downward toward the base so that the center bar 44 slides along the top surface 24, 26 of the bifurcated base with the bottom surfaces 58, 60 of the center bar slidingly engaging respective top surfaces 24, 26 of the first tooth. As the first center bar slidingly engages, the flaps 46, 48 abut the bifurcated end portions of the stab and move pivotally upwardly relative to the center bar 44. As the center bar engages the bottom surfaces of the first tooth, the flaps pivot downward into engagement with the top surface of the second teeth. From this point, further downward pressure on the flaps cause the flaps to slidingly engage the top surface of the respective second tooth and slide onto the second surface or bottom surface of the tooth. This motion and engagement of the flap and second teeth urge the second teeth and the bifurcated end portion toward the center bar thereby assuring firm engagement therewith. It is easily seen that the angles of the tooth and the flaps and the center bar can be designed so that firm engagement is achieved and each successively lower second tooth which is engaged by the flap urges more positive engagement of the bifurcations in the central bar thereby making a tighter connection between the base and cover.

In one configuration of the fastener assembly, the top surface of the first tooth was displaced from the vertical by 30 degrees in a clockwise direction while the bottom surface was displaced from the vertical by 75 degrees. The top surface and bottom surface of the first tooth formed an angle between them of approximately 45 degrees. On the other hand, the top surface of the second tooth was displaced from the vertical by 30 degrees and the bottom surface of the second tooth was displaced from the vertical by about 120 degrees forming an angle at the junction of the surfaces of approximately 90 degrees. Of course, these angles are variable depending upon the material to be fastened and the material of which the fastener itself is composed.

It will now be appreciated that there has been disclosed a fastener assembly which has dual teeth for positive latching engagement. This fastener assembly can be used to fasten load centers and other flat members, as well as bundles of things. The fastener may be used as a single assembly or several fasteners may be used together as in the case of the load center. The fastener assembly is constructed of plastic parts and can be assembled without the use of tools. At the same time, this fastener assembly is easily adapted for assembly operation using automated assembly equipment.

As will be evident from the foregoing description, certain aspects of the invention are not limited to the particular details of examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A fastener assembly having dual teeth, comprising:
   a base with an upstanding stab having a single first tooth having a top surface and a bottom surface and positioned on one side of the stab and at least one second tooth having a top surface and a bottom surface and positioned on the opposite side of the stab; and
   a cover defining an opening receiving the stab with the teeth thereon, said cover having a bar adjacent the opening and a flap extending into the opening opposite the bar, said bar sliding along the top surface of the first tooth during assembly and urging the first tooth and stab in a direction toward the flap until the bar engages the bottom surface of the first tooth, the flap being pivotally moved towards and from the base and automatically moving from the base during assembly as the first tooth and stab are urged toward the flap, the flap engaging the second tooth when assembled inhibiting separation of the base and cover.

2. A fastener assembly according to claim 1, including a plurality of second teeth, during assembly said flap temporarily engaging one of said plurality of second teeth thereby inhibiting separation of the stab and cover by an upper, lesser firm engagement, said flap engaging a second one of said plurality of teeth which is positioned between said one of the plurality of second teeth and the base thereby inhibiting separation of the stab and cover by a lower, more positive engagement.

3. A fastener assembly having dual teeth, comprising:
   a base with an upstanding bifurcated stab each bifurcation having a single first tooth having a top surface and positioned on one side of the bifurcation and at least one second tooth having a top surface and a bottom surface and positioned on the opposite side of the bifurcation; and
   a cover defining openings receiving the bifurcated stab with the teeth thereon, said cover having a central bar adjacent each opening and flaps extending into the openings opposite the central bar, said central bar sliding along the top surface of the first tooth of each bifurcation during assembly and urging each first tooth and bifurcation in a direction toward the respective flap until the central bar engages the bottom surface of the first tooth, each flap being pivotally moveable towards and from the base and automatically moving from the base during assembly as the respective first tooth and bifurcation are urged toward the flap, each flap engaging the respective second tooth when assembled inhibiting separation of the stab and cover.

4. A fastener assembly according to claim 3, wherein the top surface of each single first tooth sloped downward from the end of the stab.

5. A fastener assembly according to claim 3, wherein the top surface and bottom surface of each single first tooth form an acute angle.

6. A fastener assembly according to claim 3, wherein a first portion of the cover has a general arrow-shaped, cross-sectional configuration with a truncated tip and tail.

7. A fastener assembly according to claim 3, wherein the top surface of each second tooth slopes downward from a plane parallel to the end of the stab.

8. A fastener assembly according to claim 3, wherein the top surface and bottom surface of the second tooth form a right angle.

9. A fastener assembly according to claim 3, wherein the top and bottom surfaces of each flap form an acute angle.

10. A fastener assembly for load center comprising:
    an insulative base having upstanding stabs;
    first and second bus bars insulated from each other;
    a cover positioned over the bus bars, each base stab having a single first tooth having a top surface and a bottom surface and being positioned on one side of each stab and at least one second tooth having a top surface and a bottom surface and being positioned on the opposite side of each stab, said cover defining an opening receiving each stab with the teeth thereon, said cover having a bar adjacent the opening and a flap extending into the opening opposite the bar, said bar sliding along the top surface of the first tooth during assembly and urging the first tooth of each stab in a direction toward the flap until the bar engages the bottom surface of the first tooth, said flap being pivotally moveable towards and from the base and automatically moving from the base during assembly as the first tooth of each stab is urged toward the flap, said flap engaging the second tooth when assembled inhibiting separation of the base and cover.

11. A fastener assembly according to claim 10, including a plastic pan positioned between the base and bus bars and having an opening through which at least one of said stabs extends.

* * * * *